United States Patent Office 3,089,871
Patented May 14, 1963

3,089,871
PREPARATION OF STABLE CELLULOSE TRIESTERS
Carl J. Malm and Carlton L. Crane, Rochester, N.Y., assignors to Eastman Kodak Company, Rochester, N.Y., a corporation of New Jersey
No Drawing. Filed June 9, 1961, Ser. No. 115,908
5 Claims. (Cl. 260—227)

This invention relates to a low-temperature method for making stable cellulose triesters using sulfuric acid catalyst in which the esterification bath contains 4–9 parts of lower fatty acid anhydride and .01–.10 parts of sulfuric acid catalyst per part of cellulose and the liquid to solid ratio of the esterification mass is 5 to 10:1 in which, after the esterification, 50–90% of the catalyst is neutralized with an alkaline earth metal neutralizing agent and the mass is maintained at a moderate temperature for a time.

Previously it has been recognized that in the manufacture of cellulose esters using sulfuric acid catalyst difficulties have been involved in obtaining esters having hydroxyl contents of no more than 0.3% and sulfur contents of no more than 0.008%. Triesters having these characteristics have been difficult to manufacture by the usual esterification processes. This was particularly true in the manufacture of triesters of high intrinsic viscosity such as would be especially useful in the manufacture of high strength yarns, film base and plastics.

One method of preparing cellulose triesters involves acylation of cellulose at ordinary reaction temperatures with sulfuric acid catalyst, followed by neutralization of the catalyst with a large excess of alkaline earth metal neutralizing agent and heating the mass for an extended period of time at temperatures up to 300° F. as was described in U.S. Patent No. 3,047,561 of Carlton L. Crane. This method involved high temperature treatments. The present invention involves the use of lower temperatures and products are obtained with better color than that of the esters prepared by that previous method. Other methods have been described in the prior art for preparing stable cellulose esters, but difficulties of one kind or another have been involved in those procedures and the cellulose esters obtained have been characterized by the replacement of the sulfur with hydroxyl rather than with acyl. In processes involving elevated temperatures, reaction vessels capable of withstanding those temperatures and rigorous reaction conditions should be used which contributes to the cost of preparing cellulose esters.

One object of our invention is to provide a method for preparing cellulose triesters having sulfuric acid catalyst in which the resulting products have good color and extremely low hydroxyl and sulfur contents. Another object of our invention is to provide a method for preparing cellulose triesters of low hydroxyl and sulfur contents in which rigorous conditions need not be employed. Other objects of our invention will appear herein.

We have found that cellulose triesters having low hydroxyl and sulfur contents can be prepared in which cellulose is first esterified in an esterification bath comprising lower fatty acid and anhydride and sulfuric acid catalyst, in which the acid anhydride is from 4–9 parts per part of cellulose, the liquid to solid ratio in the esterification is 5 to 10:1, and the sulfuric acid catalyst used is within the range of 1–10 parts per 100 parts of cellulose, at a reaction temperature the maximum of which is within the range of 70–100° F., following which 50–90% of the catalyst is neutralized while maintaining the mass anhydrous and holding within the range of 70 to 140° F. for a time sufficient to obtain a cellulose ester of low hydroxyl and sulfur content such as for a time within the range of 15 minutes to 24 hours. It is then desirable to add an aqueous solution of lower fatty acid containing enough water to bring the esterification bath to the glacial point or no more than 5% excess of the amount of water required to neutralize all of the anhydride present in the esterification bath. Additional alkaline earth metal compound at least sufficient to neutralize the residual catalyst in the bath may be added either with this solution or after, this addition of alkaline earth metal compound being optional.

The mixture of esterification mass and cellulose is formed by mixing the cellulose with fatty acid, 4–9 parts of anhydride per part of cellulose, and sulfuric acid catalyst, such as 1–10% based on the cellulose, in any convenient manner so as to obtain a mass having 5 to 10 parts of bath per part of cellulose. The esterification is so controlled that the maximum temperature is restricted to 70 to 120° F. If an ester useful for yarn, film base or plastics is desired, it is preferable that the maximum temperature be restricted to the range of 70–90° F., whereas a lower viscosity ester may result when a higher maximum temperature is employed, such as up to 120° F. The reaction is continued until the cellulose has dissolved in the esterification liquid. There is then added to the mass alkaline earth metal compound in sufficient amount to neutralize 50–90% of the catalyst, such as in the form of a slurry in lower fatty acid, with little or no water therein. Some of the compounds which are useful for neutralizing the catalyst are oxides, acetates, or carbonates of calcium, magnesium or barium (salts of weak acids generally). The mass is then maintained at a temperature within the range of 70–140° F. which results in a transesterification, that is sulfur radicals present in the cellulose ester are replaced by lower fatty acid radicals. At temperatures in the lower part of the range, a considerable time is necessary for complete transesterification to take place, whereas temperatures in the higher part of the range, such as over 100° F., make for transesterification in shorter times. For instances, where the temperatures used are within the range of 100 to 120° F. transesterification should be complete in from 15 minutes to 24 hours. After the transesterification, or replacement of sulfur radicals with fatty acid radicals, it is desirable to add an aqueous solution of lower fatty acid, particularly that common to the esterification bath, the water being present in sufficient amount to neutralize all of the anhydride present but not in excess by more than 5% of the amount of water required. The addition of further alkaline earth metal neutralizing compounds is optional, either included in the aqueous fatty acid solution or after the addition of the aqueous lower fatty acid. The mass may then be diluted, precipitated and purified in the manner conventional in the manufacture of cellulose esters.

The present invention relates to the preparation of cellulose triesters of fatty acids of 2–4 carbon atoms and may be the simple esters such as cellulose acetate, or cellulose butyrate, or for preparing mixed esters such as cellulose acetate propionate or cellulose acetate butyrate.

The following examples illustrate our invention:

Example 1

4.2 parts of undried acetylation grade cotton linters were soaked in distilled water and then dehydrated with successive changes of propionic acid. The resulting activated linters consisting of 4 parts cotton linters and 4 parts of propionic acid (96–98% strength) were placed in a jacketed sigma bladed mixer, together with 24 parts of cooled 97% propionic anhydride. The mass was cooled to 40–42° F. and a mixture consisting of 0.1 part of propionic acid and 0.074 part of 94.2% sulfuric acid was added. The mixer was run and the reaction temperature was allowed to rise to 80° F. over a period of 7½ hours, completing the esterification.

There was then added a slurry consisting of 0.0525 part of 86% magnesium carbonate freshly mixed with 0.3 part of propionic acid, whereupon the temperature of the mass raised to 120° F. The mass was maintained at this temperature for 24 hours with 5 part samples being removed at intervals of 15 minutes, 2 hours, 6 hours, 12 hours, and 24 hours. To each sample was added a mixture consisting of 0.322 part of water and 1.88 parts of propionic acid. Each was diluted with sufficient propionic acid to yield a good, easily purified product when poured into agitated, distilled water. Upon pouring into water precipitates were obtained which were then washed in successive changes of distilled water until essentially free of uncombined acid and were then dried at 160° F. Analysis of each of these products gave the following results:

| Sample | Percent Total S | Percent Total OH | Intrinsic Viscosity in 118/12 9:1 |
|---|---|---|---|
| 15 min | 0.003 | 0.08 | 2.04 |
| 2 hr | 0.004 | 0.05 | 1.90 |
| 6 hr | 0.003 | 0.03 | 1.66 |
| 12 hr | | | 1.53 |
| 24 hr | 0.003 | 0.02 | 1.37 |

The concentrated solutions were colorless.

*Example 2*

10 parts of acetylation grade cotton linters were soaked in distilled water and were then dehydrated with successive changes of propionic acid. The activated linters which consisted of 10 parts of cellulose and 9.7 parts of 96–98% propionic acid were placed in a jacketed sigma bladed mixer with 60 parts of 97% propionic anhydride and the mass was cooled to 40° F. There was then added a mixture of 0.182 part of 96% sulfuric acid and 0.3 part of propionic acid. The mixer was run and the reaction temperature was allowed to rise to 80° F. over a period of 9 hours. 0.14 part of 86% magnesium carbonate was then stirred directly into the mass and its temperature was raised from 78° F. to 106° F. over a period of 20 minutes. Rapid transesterification occurred.

A mixture of 0.483 part of water and 34.5 parts of propionic acid was added to the mass at a uniform rate over a period of 30 minutes while the temperature was being raised to 120° F. A slurry of 0.055 part of magnesium carbonate and 1 part of propionic acid was stirred into the esterification mass. A viscous solution resulted. It was diluted with 125 parts of propionic acid and precipitated into a 40% acetic acid bath. The fine soft precipitate obtained was washed with water until essentially free from uncombined acids. It was then boiled in distilled water for 2 hours. The product was then boiled for 2 hours in distilled water containing 0.044 part of oxalic acid. It was washed in 3 changes of distilled water and dried at 160° F. The dried product analyzed as follows:

Total hydroxyl _____ percent  0.03
Total sulfur _____ percent  0.003
Intrinsic viscosity in a mixture of 9 parts of methylene chloride and 1 part of alcohol _____ 1.67

The product gave a clear water-white viscous solution when dissolved at 15% concentration in a mixture of 85 parts of methylene chloride, 5 parts of methyl alcohol and 10 parts of acetone.

In the above examples acetic or butyric anhydrides and acids may be employed in equivalent amounts to the corresponding propionic compounds to prepare acetates or butyrates of cellulose or mixed esters of cellulose having a plurality of fatty acid radicals of 2–4 carbon atoms.

We claim:

1. A method of making stable cellulose triesters which comprises esterifying cellulose with an esterification bath comprising 4–9 parts of lower fatty acid anhydride and .01–.10 part of sulfuric acid per part of cellulose, the liquid to solid ration in the esterification being 5–10:1 and the maximum temperature being restricted to 70–120° F., followed by neutralizing 50–90% of the sulfuric acid catalyst in the completed esterification mass with an alkaline earth metal neutralizing agent and maintaining in anhydrous condition at a temperature within the range of 70–140° F. thereby imparting low hydroxyl and sulfur contents to the cellulose ester, adding thereto aqueous lower fatty acid in amount no more than 5% excess of that necessary to convert the anhydride present to lower fatty acid and subsequently separating the cellulose ester from the mass.

2. A method of making stable cellulose triacetate which comprises esterifying cellulose with an esterification bath comprising 4–9 parts of acetic anhydride and .01–.10 part of sulfuric acid per part of cellulose, the liquid to solid ratio of the esterification mass being 5–10:1 and the maximum esterification temperature being restricted to 70–120° F., followed by neutralizing 50–90% of the sulfuric acid catalyst in the completed esterification mass with an alkaline earth metal neutralizing agent and maintaining in an anhydrous condition at a temperature of 70–140 F. thereby imparting low hydroxyl and sulfur contents to the cellulose ester, adding thereto aqueous acetic acid in amount no more than 5% excess of that necessary to convert the anhydride present and subsequently separating the cellulose ester from the mass.

3. A method of making stable cellulose triesters which comprises esterifying cellulose with an esterification bath comprising 4–9 parts of lower fatty acid acid anhydride and .01–.10 part of sulfuric acid per part of cellulose, the liquid to solid ratio in the esterification being 5–10:1 and the maximum temperature being restricted to 70–90° F., followed by neutralizing 50–90% of the sulfuric acid catalyst in the completed esterification mass with an alkaline earth metal neutralizing agent and maintaining the mass in anhydrous condition at a temperature within the range of 70–140° F. thereby imparting low hydroxyl and sulfur contents to the cellulose ester, followed by adding thereto aqueous lower fatty acid in amount no more than 5% excess of that necessary to convert the anhydride present and subsequently separating the cellulose ester from the mass.

4. A method of preparing stable cellulose tripropionate which comprises esterfying cellulose with an esterification bath comprising 4–9 parts of propionic anhydride and .01–.10 part of sulfuric acid per part of cellulose, the liquid to solid ratio in the esterification being between 5:1 and 10:1 and the maximum temperature being restricted to 70–120° F., followed by neutralizing 50–90% of the sulfuric acid catalyst in the completed esterification bath with an alkaline earth metal neutralizing agent and maintaining the mass in anhydrous condition at a temperature within the range of 70–140° F., thereby imparting low hydroxyl and sulfur contents to the cellulose propionate, adding thereto aqueous propionic acid in an amount no more than 5% excess of that necessary to convert the anhydride present and subsequently separating the cellulose propionate from the mass.

5. A method of preparing stable cellulose tripropionate which comprises esterifying cellulose with an esterification mass containing for every 4 parts of cellulose approximately 16 parts of propionic anhydride and approximately 0.074 part of sulfuric acid, in which the reaction temperature is allowed to rise to 80° F. and the esterification is completed at that temperature, adding to the completed esterification mass a slurry of 0.0525 part of 86% magnesium carbonate mixed with 0.3 part of propionic acid and maintaining at a temperature of approximately 120° F., thereby imparting low hydroxyl and sulfur contents, adding aqueous propionic acid in an amount no more than 5% excess of that necessary to convert the anhydride present and subsequently separating the cellulose ester from the mass.

References Cited in the file of this patent
UNITED STATES PATENTS

| | | |
|---|---|---|
| 2,072,260 | Haney | Mar. 2, 1937 |
| 2,126,190 | Hofman | Aug. 9, 1938 |
| 2,203,700 | Seymour et al. | June 11, 1940 |
| 2,456,688 | Dreyfuss et al. | Dec. 21, 1948 |
| 2,582,049 | Malm et al. | Jan. 8, 1952 |
| 2,673,202 | Crane | Mar. 23, 1954 |